UNITED STATES PATENT OFFICE.

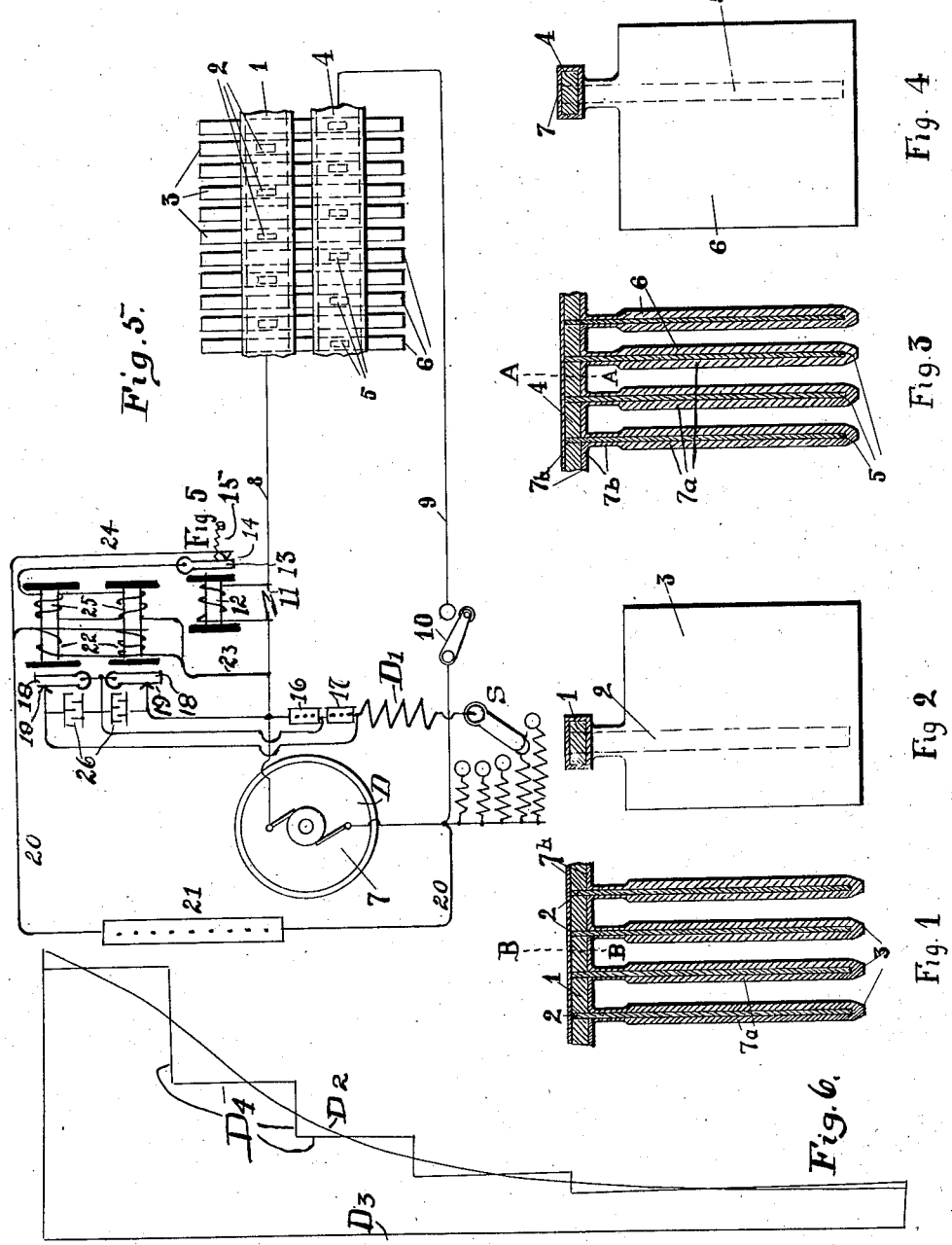

DAVID H. WILSON, OF RIDGEWOOD, NEW JERSEY, ASSIGNOR TO WILSON STORAGE BATTERY COMPANY, OF NEW YORK, N. Y., A CORPORATION OF NEW YORK.

METHOD OF CHARGING STORAGE BATTERIES.

1,126,665.  Specification of Letters Patent.  Patented Jan. 26, 1915.

Application filed July 17, 1912. Serial No. 709,881.

*To all whom it may concern:*

Be it known that I, DAVID H. WILSON, a citizen of the United States, residing at Ridgewood, in the county of Bergen and State of New Jersey, have invented certain new and useful Improvements in Methods of Charging Storage Batteries, of which the following is a specification.

The object of my invention is to reduce the time required to charge storage batteries having low resistance leading-in wires in their plates so that they are capable of receiving a heavy amperage of current without injury.

It consists further of a method of charging which avoids the steady consumption of lead or Planté battery plates by eliminating the "forming" action, that is, the continual and progressive transformation of the lead of a plate into active material which is incident to charging with the ordinary currents of small volume. This "forming" action slowly eats up the plate and deposits mud, more particularly from the positive side, in the bottom of the cell.

My method is only applicable to plates having such low resistance leading-in pathways for the current that the excessive heating and burning up of the plates which would otherwise result from such heavy charging, is avoided.

Among the results of my new method are the great reduction in the cost of a charging plant and its operation in proportion to the work done; a great increase in speed of storing batteries; a great increase in the durability of batteries; an even distribution of the charge over the ribs of the battery plates and into the inner most crevices and corners between the ribs; a great reduction in "shedding"; and a great increase in battery efficiency.

Heretofore it has been the custom to charge a battery having positive plates 9⅝"x10"x17 lbs., and negative plates 9¾"x10"x11 lbs., 20 odd in number, with a current starting at 50 amperes and then reduced to 25 amperes until the charging was completed. The amperage was further slightly tapered by the increasing counter electromotive force of the battery. I find that it is possible to increase the charging current for such batteries to as much as 200 amperes for a short period of time and then reduce the charge rapidly at first and then more slowly, so that the charging current approximates the curve of maximum charging current which the batteries may be capable of receiving without substantial injury. When the same batteries are provided with my leading-in conductors or low resistance pathways the current may be jumped to an initial amperage of 1500, it may then be tapered down to 1000, then to 600, then to 300, and then to 200 amperes, these various degrees of current preferably though not necessarily lasting for definite periods so that the average tapering charge coincides with the maximum curve of efficiency. The 1500 ampere charge may have a duration of 15 minutes. The 1000 ampere and 600 ampere periods may have a duration of 15 minutes also. The 300 ampere period may last 20 minutes and the 200 ampere period may last 40 minutes; thus making one and three quarter hours for a full charge. If the battery is not entirely discharged the charging current may start in at a point corresponding with the degree of charge required.

In the drawings; Figure 1 is a view in longitudinal section of a group of battery plates suitable for my method of charging. Fig. 2 is a section thereof upon the line B—B Fig. 1. Fig. 3 is a view of another group of battery plates for the same battery, adapted to be connected to the other pole of the charging machine. Fig. 4 is a section thereof on line A—A Fig. 3. Fig. 5 is a diagram of the charging circuits. Fig. 6 is a diagram of the possible current charge showing its variations.

The battery shown in Fig. 1 has a copper bus bar 1 connected with copper distributing bars 2 which may form the low resistance leading in pathways for conducting a heavy current into the interiors of the plates of the battery. The distributing bars furnish a large area of contact between the copper and the lead so that the lead may receive a heavy charging current without heating. They may for convenience pass through the plates nearly to the bottom. The distributing bars are united to the bus bars directly, preferably by brazing, so that the heavy current may pass from one to the other without heating the joints. Any other construction permitting the introduction of a non-"forming" current into the plates may be employed.

In Fig. 2 the distributing bars are indicated by broken lines. A bus bar 4 and distributing bars 5 are shown in connection with the plates 6 shown in Figs. 3 and 4.

In Fig. 5 is shown a system of circuits and apparatus by means of which my method may be put into effect. The machine is connected by conductors 8 and 9 to the bus bars 1 and 4 respectively; and a switch 10 to open and close the charging circuit. The switch S is preferably a rheostat capable of varying the amperage delivered to the battery. It is in the shunt circuit with the shunt field coil $D^1$ and is adapted to vary the current flowing through the field coil in order to vary the output of the charging machine. The resistances of the rheostat are adjusted to deliver from the charging machine the maximum amperages hereinbefore set forth or any such variations of them as may be desired for any particular purpose.

My method may be employed with a D. C. feeder system run into a garage, for example, for charging vehicles. When so used various modifications of the apparatus shown may be made to suit its application. The same high initial charge with the rapid tapering of the charge are preferably employed in this application.

The distributing and bus bars are covered with lead or such suitable sheathing $7^b$ as will protect them from the electrolyte. The sheathing $7^a$ on the distributing bars is so applied as to form a close union with the copper, and is preferably applied by "squirting," that is, the copper is passed through a bath of molten lead, and is led out of the bath through a die in which the lead surrounding the copper is chilled and solidified. Hydraulic pressure renders the lead nonporous and hard, thus effectually protecting the copper from the acid of the battery. The distributing bars and the bus bars may be united by brazing or by drive fits, and the joints covered with burned lead. The lead of the plates may be joined to the sheathing of the distributing bars by being burned thereto, or in any other suitable manner.

The battery plates are connected up as shown in Fig. 5, the distributing bars 2 of the plates 3 being united to the bus bar 1, and the distributing bars 5 of the plates 6 being united to the bus bar 4. In this way the distributing bars of the alternate plates are staggered. It has been found in practice that if the distributing bars lie opposite to each other, a heavy charge sets up a localized action and the lateral extremities of the plates farthest from the distributing plates are less evenly charged, thus setting up undue stresses and extreme buckling.

In order to prevent too great amperage from being delivered to the battery at the beginning of a charge a regulator is employed. It consists of a coil 11 in the main circuit, and a shunt coil 12 adapted to attract an armature 13 so as to open the circuit at contact 14. The spring 15 is adjusted to counteract the pull of the coil 12 so long as the current flowing through the main circuit is not too great for my method. When, however, the current exceeds the maximum allowed, more of the current is passed through the coil 12, overpowering the spring 15, opening the circuit at contact 14. This has the effect of introducing into the main circuit the resistances 16 and 17, or as many more as may be desired, there being a contact 19 and armature 18 for every such resistance. Each armature 18 is operated by a double wound magnet having a coil 22 and 25. The coils 22 are permanently in circuit with the charging machine in a shunt. The coils 25 are in the circuit containing the contact 14.

The coils 22 and 25 neutralize each other normally and the armatures 18 are not attracted, so that the closed contacts 19 close short circuits around the resistances 16 and 17. When, however, the circuit is opened at contact 14 as described, the coils 25 become dead, and the coils 22 operate the armatures 18 to open the circuits at contacts 19 to introduce the resistances 16 and 17 into the shunt circuit. They have the effect of reducing the flow of current in the shunt field coil $D^1$ which in turn reduces the amperage output of the charging machine. When the amperage falls to the established maximum the spring 15 overpowers the coil 12, the contact 14 is closed, the coils 25 instantly neutralize the coils 22, the armatures 18 engage the contacts 19, and the resistances are short-circuited.

In circuit with the coils 22 and 25 is a resistance 21 to adjust the flow of current through the shunt containing the coils 22 and 25 to the proper amount.

The condensers 26 are bridged across the contacts 19 to prevent injury to them.

In place of the resistances 16 and 17 any other devices may be used, as long as the maximum current delivered to the battery is held down to the desired amount.

The range of current useful with the best form of my method may be defined as that which on the one hand will not injure a battery having low resistance leading-in pathways in the high resistance plates, and which on the other hand will injure or destroy, other conditions being equal, plates not so equipped. It is applicable to plates of the Planté or Faure type.

The apparatus shown is but one form of many by means of which my method of charging may be effected.

The great value of my method is apparent from the fact that a plant which has a great many batteries to keep charged and only a limited time, can charge a great many batteries in multiple at the rapid high rate by placing a number of rheostats in a feed system or, for very large batteries, a special machine which will charge one battery at a time. Thus the interest cost on the charging plant, and the labor are greatly reduced. It has also been found that batteries charged with my method are more durable, due to the fact that the charging current acts upon the inmost corners of the spaces between ribs on the plates, thereby firmly uniting the ribs to the bodies of the plates. "Shedding" is, therefore, minimized, and plates are from two to four times as durable, other conditions being equal. The advantage to the user of the batteries, in getting them charged in one fifth of the time more or less, fills a long felt want.

When the reduction of the amperage of the charging current follows the theoretical curve of a battery charged as indicated by the line $D^2$, the best results are obtained. Approximate results are secured by charging in accordance with the stepped line $D^4$ of which the distance from the base line $D^3$ indicates the amperage, and the lines parallel to $D^3$ indicate the time of the charge.

This invention is generic with respect to my subsequent invention described in my application #623,053, filed April 24th 1914.

What I claim is:

1. The method of charging storage batteries having lead plates provided with low resistance leading-in pathways to conduct the current to the plate surfaces, which consists of applying a charging current thereto of such proportions as would destroy the efficiency of plates having no such pathways but which will preserve the efficiency of plates provided with such pathways, other conditions being equal.

2. The method of charging storage batteries having lead plates provided with low resistance leading-in pathways to lead the current to the plate surfaces which consists of applying a charging current thereto of such proportions as would destroy the efficiency of plates having no such pathways, other conditions being equal, but which will preserve their efficiency when provided with such pathways, said charging current being reduced by stages.

3. The method of charging storage battery having lead plates provided with low resistance leading-in pathways to lead the current to the plate surfaces which consists of applying a charging current thereto of such proportions as would destroy the efficiency of plates having no such pathways, other conditions being equal, but which will preserve their efficiency when provided with such pathways, said charging current being reduced by stages to follow approximately a predetermined curve.

In testimony whereof I affix my signature in presence of two witnesses.

DAVID H. WILSON.

Witnesses:
A. L. TRAVIS,
MYRON F. HILL.